United States Patent
Crupi et al.

(10) Patent No.: US 6,195,636 B1
(45) Date of Patent: Feb. 27, 2001

(54) SPEECH RECOGNITION OVER PACKET NETWORKS

(75) Inventors: Joseph A. Crupi; Zoran Mladenovic; Edward B. Morgan; Bogdan R. Kosanovic, all of Germantown, MD (US); Negendra Kumar, McLean, VA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/253,017

(22) Filed: Feb. 19, 1999

(51) Int. Cl.[7] ................................................. G10L 19/00
(52) U.S. Cl. .......................... 704/231; 704/201; 704/243; 704/256; 704/241
(58) Field of Search .................................. 704/233, 241, 704/243, 231, 256, 270, 275, 201

(56) References Cited

U.S. PATENT DOCUMENTS

| | | |
|---|---|---|
| 4,644,107 | 2/1987 | Clowes et al. ................. 379/354 |
| 4,928,302 | 5/1990 | Kaneuchi et al. ................ 379/88 |
| 4,945,570 | 7/1990 | Gerson et al. ................. 381/110 |
| 5,036,539 | 7/1991 | Wrench, Jr. et al. ............. 381/43 |
| 5,166,971 | 11/1992 | Vollert ........................... 379/88 |
| 5,396,542 | 3/1995 | Alger et al. ..................... 379/67 |
| 5,475,792 * | 12/1995 | Stanford et al. ................ 704/233 |
| 5,513,298 * | 4/1996 | Stanford et al. ................ 704/243 |
| 5,524,051 | 6/1996 | Ryan .............................. 380/9 |
| 5,572,583 | 11/1996 | Wheeler, Jr. et al. ........... 379/207 |
| 5,659,665 | 8/1997 | Whelpley, Jr. ................. 704/275 |
| 5,704,009 | 12/1997 | Cline et al. .................... 704/275 |
| 5,737,491 | 4/1998 | Allen et al. .................... 704/270 |
| 5,752,232 | 5/1998 | Basore et al. .................. 704/275 |
| 5,794,189 * | 8/1998 | Gould ............................ 704/231 |
| 5,799,275 * | 8/1998 | Itoh et al. ..................... 704/241 |
| 5,825,978 * | 10/1998 | Digalakis et al. ............... 704/256 |
| 5,839,105 * | 11/1998 | Ostendorf et al. .............. 704/256 |

OTHER PUBLICATIONS

Digalakis et al., "Quantization of Cepstral Parameters for Speech Recognition over the World Wide Web", IEEE, 1998, pp. 989–992.

Ramaswamy et al., "Compression of Acoustic Features for Speech Recognition in Network Enviroments", IEEE, 1998, pp. 977–980.

* cited by examiner

*Primary Examiner*—David Hudspeth
*Assistant Examiner*—Vijay B Chawan
(74) *Attorney, Agent, or Firm*—Warren L. Franz; Wade James Brady, III; Frederick J. Telecky, Jr.

(57) ABSTRACT

In a system in which user equipment is connected to a packet network and a speech recognition application server is also connected to the packet network for performing speech recognition on speech data from the user equipment, a speech recognition system selectively performs feature extraction at a user end before transmitting speech data to be recognized. The feature extraction is performed only for speech which is to be recognized.

12 Claims, 3 Drawing Sheets

SPEECH RECOGNITION OVER PACKET NETWORKS

FIELD OF THE INVENTION

This invention relates to speech recognition. More particularly, this invention relates to a speech recognition system in which feature extraction is performed at a sending end of a packet network and the remainder of the recognition is performed at the receiving end.

BACKGROUND OF THE INVENTION

A typical speech recognition system operates by breaking down an input speech signal into smaller segments over time. Each segment is then individually analyzed, and some features, specifically those acoustic features that have been found relevant for the purpose of speech recognition, are extracted. These extracted features are then matched against reference models for the words in the vocabulary, and the best match is selected.

Speech recognition applications in use today, include voice activated dialing (through a telephone company) and dictation software.

In voice activated dialing through a telephone company, when a user lifts the handset of his telephone, he is connected to a speech recognition server which is located at the telephone company's exchange. The user then speaks the name of a person he wishes to be connected to, and the server interprets the voice command and performs the connection task.

The user is connected to the speech recognition server through a circuit switched network, and a part of the network bandwidth, usually of the order of 8 Kbytes/sec., is constantly devoted to the user for maintaining a connection. Here the server performs the feature extraction, after the decoder has decoded the incoming speech.

Packet networks are replacing the existing Time Division Multiplexing (TDM) based voice networks. In a packet network system 10, as shown in FIG. 1, the speech being sent to the speech recognition server 12 at the telephone exchange will be typically compressed using a speech coder at an access interface 14 at the sending end, to a low rate such as 1 Kbytes/sec. At the exchange, since the information is actually intended for the recognizer at the exchange end, the compressed speech will have to be first decoded, and then passed on to the speech recognition server 12, e.g., as PCM samples.

This type of system has at least two disadvantages, namely:

The computational load on the telephone exchange server is increased, since it has to first decode the input to speech samples, and then perform all the steps of speech recognition.

The design of compression algorithms for telephony is based on perceptual criteria of voice quality. However these criteria do not necessarily preserve the performance of the speech recognition system and therefore the speech recognition system may not perform well.

In summary, speech recognition typically requires a number of steps or stages and current speech recognition systems perform all of these steps at the same location. Such systems have a problem when the user is remote from the speech recognition system, connected to the recognition system via a system which compresses the user's speech before transmitting the compressed speech, e.g., via a packet network. Remotely transmitted speech is typically compressed before being sent over a packet network. The reason for this compression is to achieve some efficiency by saving time and space. However, speech compression algorithms are generally designed to trade off space saving with human comprehension and are not designed for compression of acoustic features. That is, they compress speech data as much as possible while still allowing a user at the receiving end to be able to understand the un-compressed speech data. What present systems fail to realize is that sometimes there is speech recognition equipment and processing at the receiving end. In those cases, the losses caused by the compression (and un-compression) of the speech data may degrade speech recognition. One way to overcome this problem is, of course, to transmit uncompressed speech, but this increases the load on the network.

In addition to the problems described above, a further problem arises when a system combines speech recognition with normal speech transmission. In such cases, e.g., in a telephone system, the system would need to have separate compression algorithms for speech and its associated acoustic features which is to be recognized and for speech which is not to be recognized.

SUMMARY OF THE INVENTION

This invention provides a solution to the above and other problems by providing a system wherein the speech recognition process is broken down into two parts, namely speech feature extraction and the remainder of the speech recognition process. Further, the system automatically determines whether or not to use a speech coding algorithm, based on whether or not speech recognition is to be performed at the remote end.

Accordingly, in one aspect, this invention is a speech recognition system including user equipment connected to a packet network; and a speech recognition application server connected to the packet network for performing speech recognition on speech data corresponding to speech input to the user equipment and transmitted to the speech recognition application server via the packet network. The user equipment selectively performs partial speech recognition, specifically, feature extraction, on the speech prior to sending the speech data to the speech recognition application server. Preferably partial speech recognition (i.e., feature extraction) is performed only if speech recognition is to be performed at the receiving end.

In some embodiments, the partial speech recognition performed by the user equipment includes feature extraction from the speech, and wherein the speech data comprises these features. The feature extraction includes at least one of: cepstral analysis, spectral analysis and perceptual analysis, and the extracted features are compressed prior to being transmitted over the packet network. The features are compressed using at least one of: linear quantization and vector quantization.

In another aspect, this invention is a method, in a system in which user equipment is connected to a packet network and a speech recognition application server is also connected to the packet network for performing speech recognition on speech data. The method includes inputting speech to the user equipment and the user equipment selectively performing partial speech recognition on the speech prior to sending the speech data to the speech recognition application server. Preferably partial speech recognition is performed only if speech recognition is to be performed at the receiving end.

The partial speech recognition performed by the user equipment may include feature extraction from the speech, and wherein the speech data comprises these features. The feature extraction may include at least one of: cepstral analysis, spectral analysis and perceptual analysis. In some embodiments, the method includes compressing the extracted features prior to transmitting them over the packet network. The compression may include compressing the features using at least one of linear quantization and vector quantization.

In yet another aspect, this invention is a device having a mechanism for inputting speech; and a mechanism constructed and adapted to selectively perform partial speech recognition on the speech to produce speech data. The partial speech recognition may include feature extraction from the speech, and wherein the speech data comprises these features, and the feature extraction may include at least one of: cepstral analysis, spectral analysis and perceptual analysis. Preferably partial speech recognition is performed only if speech recognition is to be performed at the receiving end.

The device may also have a mechanism constructed and adapted to compress the extracted features. The device may compress the features using at least one of linear quantization and vector quantization.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which.

DETAILED DESCRIPTION OF THE PRESENTLY PREFERRED EXEMPLARY EMBODIMENTS

The various speech recognition mechanisms described herein can be implemented using hardware, software or a combination thereof. When implemented as a software program, the program can be in a RAM, a ROM, an internal or external disk, a CD ROM, an ASIC or the like. In general, when implemented as a program or in part as a program, the program can be encoded on any computer-readable medium or combination of computer-readable media, including but not limited to a RAM, a ROM, a disk, an ASIC, a PROM and the like.

In preferred embodiments, the mechanisms of this invention are implemented in software using the C programming language running on a general purpose computer.

Figure 1:
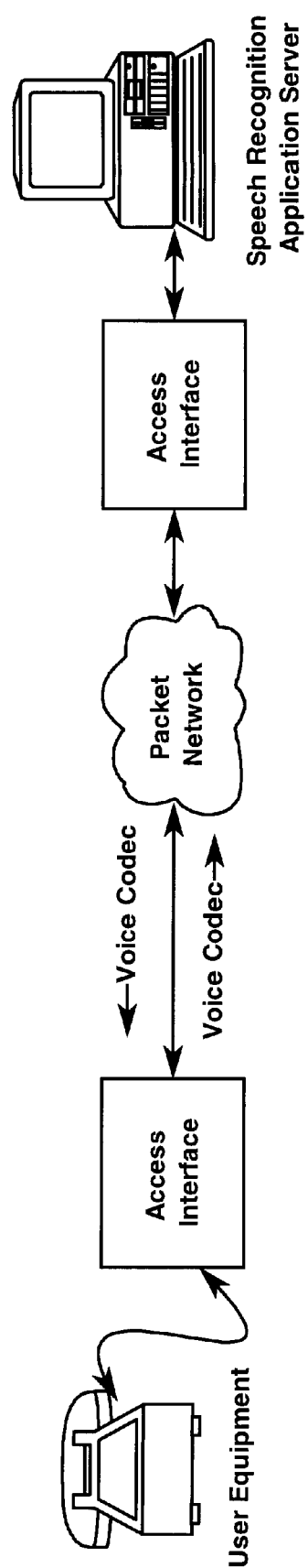
FIG. 1 shows a conventional speech recognition system architecture.
Figure 2:
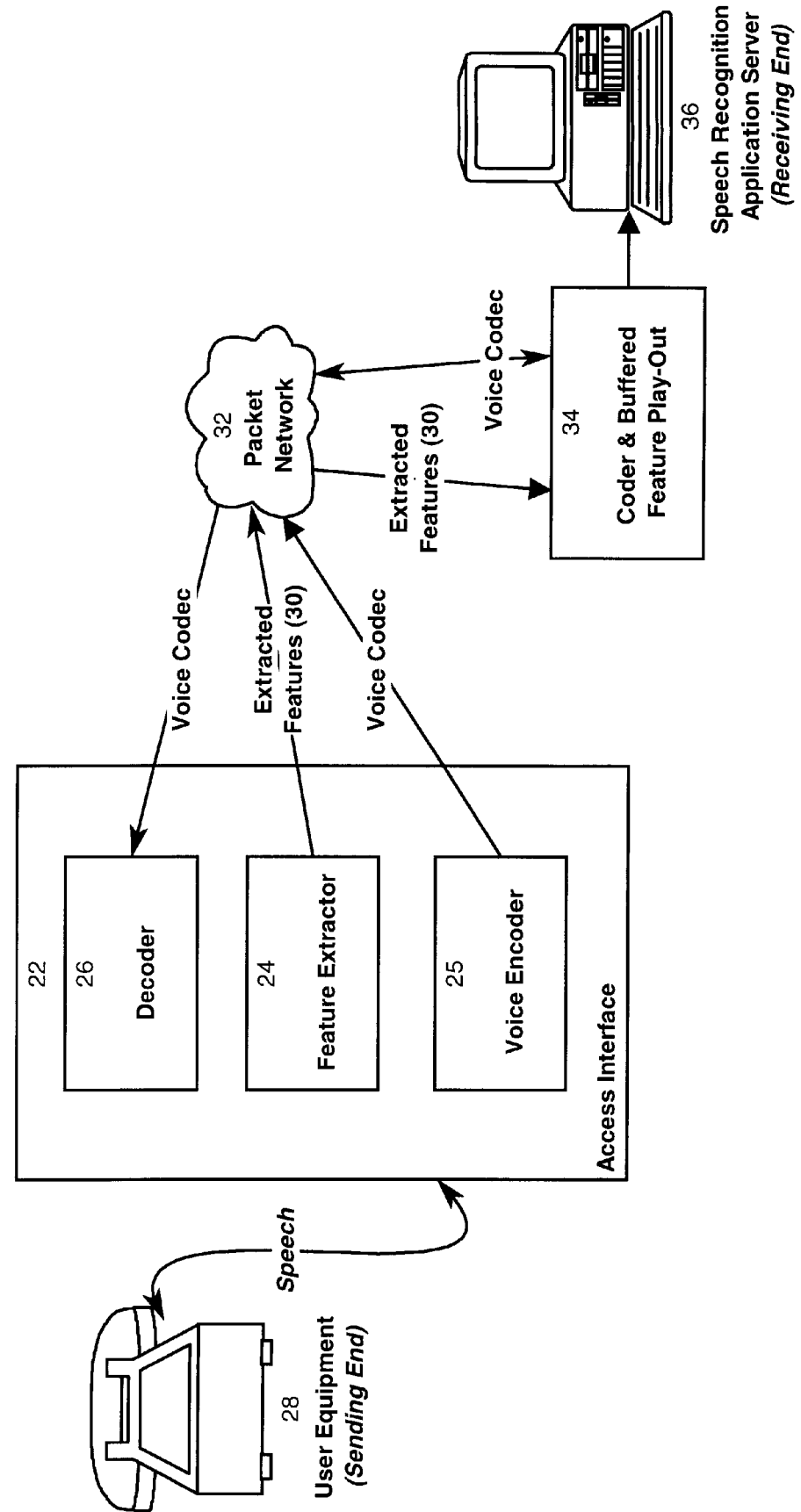
FIG. 2 shows a speech recognition system architecture according to the present invention.
Figure 3:
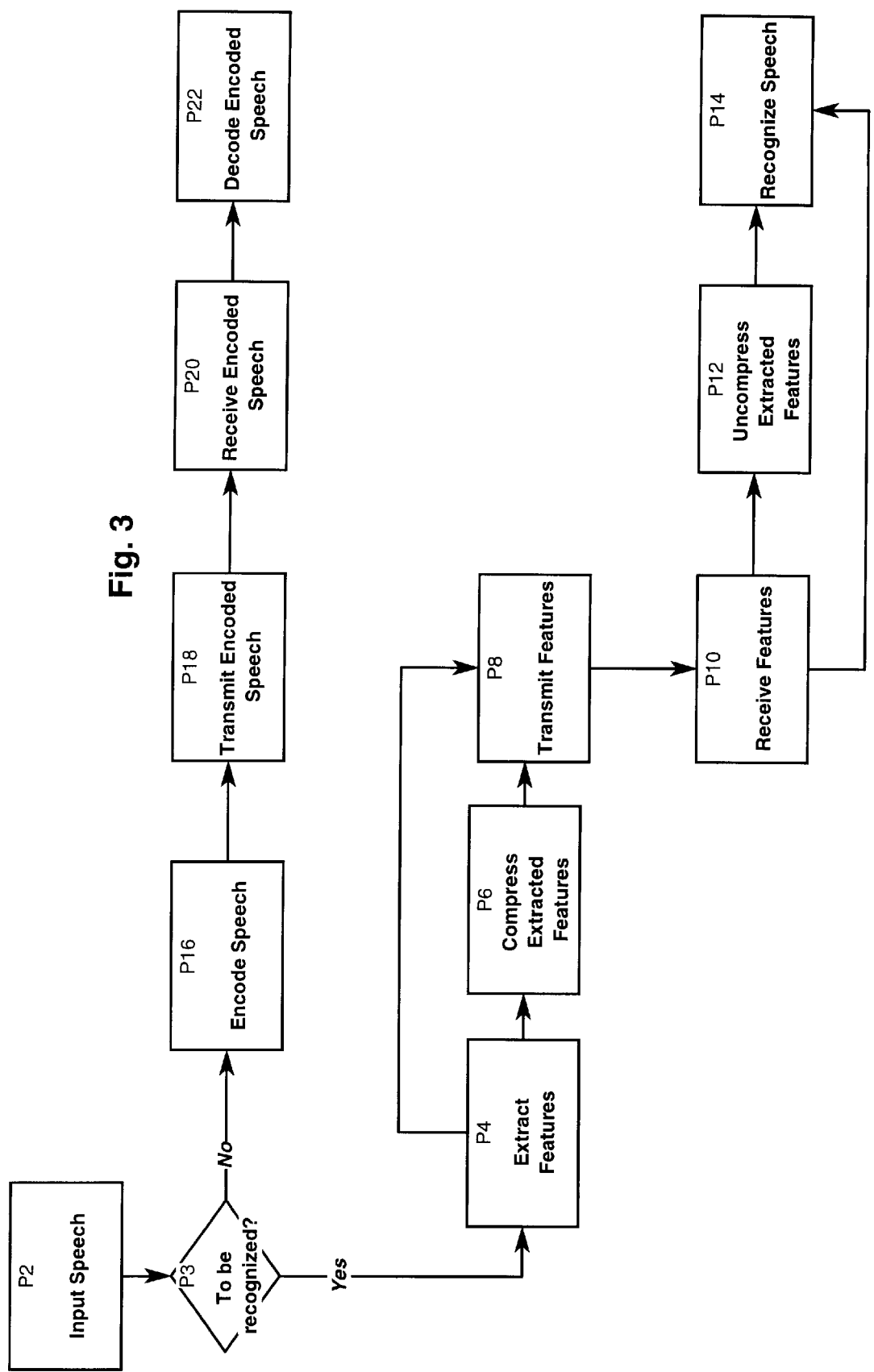
FIG. 3 shows a flow chart of the operation of the present invention.

With reference to FIGS. 2 and 3, a speech recognition system 20 has an access interface 22 at the user or sending end of the system. The access interface 22 includes a feature extractor mechanism 24, an encoder mechanism 25 and a decoder mechanism 26. Speech is input by a user (at P2) using user equipment 28. The system first determines (at P3) whether or not the speech is to be recognized downstream (at the receiving end). If the speech is to be recognized downstream, the feature extractor mechanism 24 extracts speech features (at P4) from input speech using various techniques, including, but not limited to:

(a) Cepstral analysis (e.g., Cepstrum, LPC Cepstrum, PLP Cepstrum, Mel Ceptstrum, and the like);

(b) Spectral analysis (e.g., LPC (linear prediction coefficients), LSP (line Spectral pairs), Filterbacks and the like); and (c) Perceptual analysis (e.g., EIH, PLP, RASTA-PLP, and the like).

The extracted speech features 32 are then transmitted (at P8) over the packet network 34, either uncompressed or compressed (at P6) using one or more of the following techniques:

(a) Linear Quantization (e.g., floating-point representation with fewer coefficients or fixed-point representation); and (b) Vector Quantization (e.g., fixed and/or adaptive codebooks and the like).

At the receiving end, the extracted speech features 32 (compressed or not) are received (at P10) and passed directly to the speech recognition mechanism 34. If necessary, i.e., if the features were compressed before being sent (at P6), the extracted speech features 32 are uncompressed (at P12). The speech recognition mechanism 34 does not perform feature extraction since this has already been done. It begins its speech recognition (at P14) at the step following feature extraction.

If it is determined (at P3) that the speech is not to be recognized at the receiving end, then the speech is encoded (including possible compression) (at P16) and the encoded speech is transmitted (at P18) to the receiving end. The transmitted encoded speech is received (at P20) and decoded (at P22).

The decision made as to whether or not to perform local feature extraction (made at P2 in FIG. 3) is as follows:

When user equipment (a client) and a server first interact, using a handshake protocol, they exchange information regarding their various capabilities. In particular, the server informs the client whether or not it is going to use a speech recognition algorithm and the client informs the server of its speech recognition capabilities. Once the server knows of the client's capabilities, it makes requests of the client to send data packets encoded with the appropriate algorithm. For example, the client and server may exchange information which informs the server that the client is capable of performing partial speech recognition and of compressing the recognized data using a particular algorithm. The server, in this example, may then send a request to the client to begin/end using that partial recognition. In this manner, the speech recognition may be selectively initiated (and stopped) by the server.

Thus, speech recognition over packet networks is provided. One skilled in the art will appreciate that the present invention can be practiced by other than the described embodiments, which are presented for purposes of illustration and not limitation, and the present invention is limited only by the claims that follow.

What is claimed:

1. A speech recognition system comprising:
   user equipment connected to a first side of a packet network for accepting speech input; and for performing partial speech recognition of said speech input, and;
   a speech recognition application server connected to a second side of said packet network for performing speech recognition on speech data corresponding to said speech input wherein:
   said speech data includes feature extraction data from said partial recognition which is provided across said packet network to said speech recognition application server according to a first protocol and includes decompressed speech transmitted to the speech recognition application server via the packet network according to a second protocol, said speech recognition application server performing said speech recognition based upon said feature extraction data and said decompressed speech.

2. A system as in claim 1 wherein the partial speech recognition performed by the user equipment includes feature extraction of features included within the speech.

3. A system as in claim 2 wherein the feature extraction includes at least one of: cepstral analysis, spectral analysis and perceptual analysis.

4. A system as in claim 1 wherein the extracted features are compressed prior to being transmitted over the packet network.

5. A system as in claim 4 wherein the features are compressed using at least one of: linear quantization and vector quantization.

6. A speech recognition system according to claim 1, further comprising:

means for generating a recognition signal if speech recognition is to be performed by said speech recognition application server; and means for receiving said recognition signal and for inhibiting said feature extraction and said transmission of extracted features unless said recognition signal is received.

7. In a system in which user equipment is connected to a first side of a packet network and a speech recognition application server is connected to a second side of said packet network for performing speech recognition on speech data, a method for implementing speech recognition across a packet network, comprising:

inputting speech to said user equipment;

extracting features from said speech by selectively performing partial speech recognition on said speech at said user equipment side of said packet network;

transmitting said extracted features across said network to said speech recognition application server according to a first codec selected for transmission of extracted features, and transmitting said speech across said network to said speech recognition application server according to a second codec selected for transmission of speech, and providing said speech and said extracted features as speech data to said speech recognition application server for recognition.

8. A method as in claim 7 wherein the partial speech recognition performed by the user equipment includes feature extraction of features included within the speech.

9. A method as in claim 8 wherein the feature extraction includes at least one of: cepstral analysis, spectral analysis and partial analysis.

10. A method as in claim 7 further comprising:

compressing the extracted features prior to transmitting them over the packet network.

11. A method as in claim 10 further comprising:

compressing the features using at least one of linear quantization and vector quantization.

12. A method for implementation of speech recognition across a packet network according to claim 7, further comprising the steps of:

providing an indication that speech recognition is to be performed at said second side of said packet network by said speech recognition application server;

receiving said indication at said first side of said packet network; wherein said feature extraction is performed only upon receipt of said indication.

\* \* \* \* \*